United States Patent
Medici

(10) Patent No.: US 11,296,537 B2
(45) Date of Patent: Apr. 5, 2022

(54) ELECTRICAL ENERGY SUPPLY UNIT AND CONTROL THEREFOR

(71) Applicant: Power-Blox AG, Frick (CH)

(72) Inventor: Alessandro Medici, Laufenburg (CH)

(73) Assignee: Power-Blox AG, Frick (CH)

( * ) Notice: Subject to any disclaimer, the term of this patent is extended or adjusted under 35 U.S.C. 154(b) by 603 days.

(21) Appl. No.: 16/309,485

(22) PCT Filed: Jun. 15, 2017

(86) PCT No.: PCT/EP2017/064705
§ 371 (c)(1),
(2) Date: Dec. 13, 2018

(87) PCT Pub. No.: WO2017/216308
PCT Pub. Date: Dec. 21, 2017

(65) Prior Publication Data
US 2019/0312455 A1 Oct. 10, 2019

(30) Foreign Application Priority Data

Jun. 15, 2016 (WO) .................. PCT/EP2016/063787

(51) Int. Cl.
*H02J 7/34* (2006.01)
*H02J 1/10* (2006.01)
(Continued)

(52) U.S. Cl.
CPC ...... *H02J 7/34* (2013.01); *H02J 1/10* (2013.01); *H02J 3/382* (2013.01); *H02J 3/40* (2013.01);
(Continued)

(58) Field of Classification Search
CPC .... H02J 7/34; H02J 7/0021; H02J 3/40; H02J 1/10; H02J 3/382; H02J 2300/30;
(Continued)

(56) References Cited

U.S. PATENT DOCUMENTS

| 2002/0153867 A1* | 10/2002 | Holzer | .............. H02P 9/305 |
| | | | 322/29 |
| 2010/0181837 A1* | 7/2010 | Seeker | .............. H02J 3/383 |
| | | | 307/72 |

(Continued)

FOREIGN PATENT DOCUMENTS

| EP | 2408083 | 1/2012 |
| EP | 2595218 | 5/2013 |

(Continued)

OTHER PUBLICATIONS

International Search Report and Written Opinion for PCT International Application PCT/EP2017/064705 dated Dec. 6, 2017; Forms PCT/ISA/220, PCT/ISA/210, and PCT/ISA/237; 25 pages.

(Continued)

*Primary Examiner* — Daniel Cavallari
*Assistant Examiner* — Brian K Baxter
(74) *Attorney, Agent, or Firm* — Bond Schoeneck & King; Joseph M. Noto

(57) ABSTRACT

The invention relates to a control for an electrical energy supply unit, comprising a first filling level input, to which a first filling level of a first energy store of the electrical energy supply unit can be transmitted. In addition, the control comprises a further filling level input, to which a further filling level of an optional further energy store of a further electrical energy supply unit can be transmitted. Furthermore, the control comprises a nominal alternating voltage determiner which is designed to determine a nominal alternating voltage while taking into account the first filling level and/or the further filling level. In addition, the control comprises a nominal alternating voltage output, from which the nominal alternating voltage can be transmitted to an alternating voltage generator of the electrical energy supply unit. An electrical energy supply unit comprises a control according to the invention, a first energy store and an (Continued)

alternating voltage generator having a first and a second terminal. The first terminal of the alternating voltage generator is connected to the first energy store in an electrically conductive manner. The alternating voltage generator is designed to generate at the second terminal an alternating voltage that corresponds to a nominal alternating voltage. An electrical energy supply system comprises an electrical energy supply unit according to the invention and at least one additional electrical energy supply unit according to the invention, which are connected to one another in an electrically conductive manner.

19 Claims, 7 Drawing Sheets

(51) Int. Cl.
*H02J 3/38* (2006.01)
*H04B 3/54* (2006.01)
*H02J 7/00* (2006.01)
*H02J 3/40* (2006.01)
*H01M 10/42* (2006.01)

(52) U.S. Cl.
CPC ............ *H02J 7/0021* (2013.01); *H04B 3/548* (2013.01); *H01M 10/4257* (2013.01); *H02J 7/0014* (2013.01); *H02J 2300/30* (2020.01); *H04B 2203/547* (2013.01)

(58) Field of Classification Search
CPC . H02J 7/0014; H04B 3/548; H04B 2203/547; H01M 10/4257
See application file for complete search history.

(56) References Cited

U.S. PATENT DOCUMENTS

| | | | |
|---|---|---|---|
| 2011/0175443 A1* | 7/2011 | Koyanagi | H02J 3/46 307/21 |
| 2011/0273022 A1* | 11/2011 | Dennis | H02J 1/10 307/72 |
| 2015/0180236 A1* | 6/2015 | Nakao | H02J 3/34 320/103 |
| 2015/0207322 A1* | 7/2015 | Nakao | H02J 3/38 307/23 |
| 2015/0293548 A1* | 10/2015 | Simons | G05F 1/66 700/295 |
| 2017/0047771 A1* | 2/2017 | Motsenbocker | H02J 3/383 |

FOREIGN PATENT DOCUMENTS

| | | |
|---|---|---|
| EP | 2827467 | 1/2015 |
| EP | 2830183 | 1/2015 |
| EP | 2858200 | 4/2015 |
| JP | 2015-82954 A | 4/2015 |
| JP | 2015082954 A | 4/2015 |
| WO | 2013/175612 A1 | 11/2013 |

OTHER PUBLICATIONS

International Search Report Translation from WIPO for PCT International Application PCT/EP2017/064705 dated Dec. 6, 2017; Forms PCT/ISA/210; 3 pages.
Notice of Reasons for Rejection for Japanese Patent No. 2018-566286 (dated Jun. 11, 2021).

* cited by examiner

ELECTRICAL ENERGY SUPPLY UNIT AND CONTROL THEREFOR

REFERENCE TO RELATED APPLICATION

This application is a U.S. National Phase filing of International Application No. PCT/EP2017/064705, filed Jun. 15, 2017, which relates and claims priority to International Application No. PCT/EP2016/063787, filed Jun. 15, 2016, the entirety of each of which are hereby incorporated by reference in their entirety.

TECHNICAL FIELD

The invention relates to a controller for an electrical energy supply unit, and to an electrical energy supply unit. The invention further relates to an electrical energy supply system and to a method for controlling an electrical energy supply unit.

BACKGROUND

More than a billion people currently live without access to electrical energy. Even within the foreseeable future, 70% of these will not enjoy access to a public electricity supply network (macrogrid). On the one hand, this hinders the economic development of the persons affected, together with their education and health. On the other hand, there is increasing demand for electrical energy which can be supplied independently of a public electricity supply network.

A variety of solutions for this purpose are available on the current market. For example, although diesel generators are available, these are expensive to operate and—frequently on the grounds of inadequate maintenance—are classified as unreliable. Small-scale solar power installations are also known, which are suitable for private use, but which have both a limited capacity range and a short service life, and are not designed for any extension. Island systems (microgrids) are also available on the market, which are configured on an application-specific basis. High procurement costs of the overall island system are disadvantageous, as is the fact that, in general, installation can only be undertaken by an expert. Moreover, island systems of this type have little flexibility, and only a limited capability for extension. In many cases, new and old island systems are not mutually combinable, or can only be combined with considerable expenditure. Island systems generally feature a central controller which, in the event of an extension, will require reprograming or adaptation. The failure of a single critical component can render the entire system unusable. In many cases, it also cannot be guaranteed that the batteries which are used in an island system will all have the same state of charge. An island system of this type, which overcomes some of the above-mentioned disadvantages, is known from EP 2 827 467 A2, in which a device and a method for the stable generation of electrical energy are disclosed.

DETAILED DESCRIPTION

The object of the invention is the achievement of an improvement vis-à-vis the prior art, and the at least partial elimination of the disadvantages of the prior art. Specifically, the invention is intended to permit the provision and operation of electrical energy supply units which deliver optimum reliability, flexibility in use and/or capability for extension. Preferably, the cost-effective operation and maintenance of electrical energy supply units should also be possible.

The fulfilment of this object is defined by the characteristics of claim 1. According to the invention, a controller for an electrical energy supply unit comprises a first filling level input, to which a first filling level of a first energy store of the electrical energy supply unit is transmittable. In addition, the controller comprises a further filling level input, to which a further filling level of an optional further energy store of a further electrical energy supply unit is transmittable. The controller further comprises a nominal alternating voltage determiner, which is designed to determine a nominal alternating voltage, in consideration of the first filling level and/or of the further filling level. Moreover, the controller comprises a nominal alternating voltage output, from which the nominal alternating voltage is transmittable to an alternating voltage generator of the electrical energy supply unit.

A controller is essentially to be understood as a device, the output variable or output variables of which are delivered in accordance with the input variables thereof. The controller according to the invention can also comprise a regulator, in order to minimize the impacts of any disturbances and/or to influence the latter, such that they observe a desired temporal variation.

The controller can comprise one or more microcontrollers, for the execution of control and regulating functions.

The filling level signifies the energy which is stored in an energy store, i.e. the available energy in an energy store. The available energy can thus be dependent upon the temporal characteristic of a load. Consequently, the filling level can also be dependent upon the load, and specifically even upon the future load. The filling level can also be expressed as a relative variable, wherein the available energy is related to the maximum energy of a full energy store. In this case, a full energy store has a filling level of 100%, and an empty energy store has a filling level of 0%.

Specifically, the filling level can also signify an electrical charge which is stored in an energy store, i.e. an available charge. A relative expression of the filling level can be provided in this case, wherein the available charge is related to the maximum charge of a full energy store.

The nominal alternating voltage is understood as the temporal characteristic of an alternating voltage which can be delivered by an electrical energy supply unit, wherein the nominal alternating voltage can differ from the absolute magnitude of the actual alternating voltage. The temporal characteristic of the nominal alternating voltage can be described by a frequency, an r.m.s. value and a zero-crossing time point. Hereinafter, it is assumed that equal frequencies are also associated with equal zero-crossings.

By the term "transmittable", it is to be understood that the controller according to the invention, in service, is or can be connected to an electrical energy supply unit according to the invention, such that the requisite operating data of the electrical energy supply unit, such as, for example, the first filling level of the first energy store, can be transmitted to the controller according to the invention. Additionally, a further electrical energy supply unit can be connected to the electrical energy supply unit in an electrically conductive manner, wherein operating data from the further electrical energy supply unit can also be transmitted to the controller according to the invention, such as, for example, the further filling level of the further energy store of the further energy supply unit. For the purposes of actual transmission, all known transmission methods can be considered, including, for example, wire-based transmission methods and/or wireless transmission methods.

The controller according to the invention can control an electrical energy supply unit which is connected to a further electrical energy supply unit in an electrically conductive manner, in consideration of an operating variable on the further controller of the further electrical energy supply unit such as, for example, the further filling level. By means of the controller according to the invention it is possible to control a network comprised of a plurality of electrical energy supply units, with no central controller. Accordingly, the failure of one controller does not result in the failure of all the electrical energy supply units, i.e. of the entire network, but only the failure of the associated electrical energy supply unit. A reliable energy supply can thus be ensured. In the event of the expansion or contraction of the network, i.e. the addition or removal of electrical energy supply units to or from the network, no modifications on the remaining controllers are required, such that all the latter can continue to remain in service. Local extensions of the network can easily be undertaken in any location. As it is not necessary for the controller or the electrical energy supply unit to be connected to a public electricity supply network, the controller and the electrical energy supply unit can be universally employed in a highly flexible and practical manner. Specifically, it has also been shown that electrical energy supply units having controllers according to the invention can also be operated and maintained in a cost-effective manner.

In one form of embodiment of the controller, the nominal alternating voltage determiner is designed to determine a nominal frequency of the nominal alternating voltage in consideration of the first filling level and/or of the further filling level, and/or the controller is designed, from a further frequency of a further alternating voltage on a further alternating voltage generator of the further electrical energy supply unit, to determine the further filling level of the further energy store.

This form of embodiment has an advantage, in that the frequency of the alternating voltage of the electrical energy supply unit can be employed, for example, in order to transmit the further filling level of the further energy store of the further electrical energy supply unit to the controller. The controller is also capable, from the further frequency of a further alternating voltage of a further electrical energy supply unit, of inferring the further filling level of the further electrical energy supply unit. Apart from the power cables between the electrical energy supply units, no additional signal or data lines are required, and likewise no wireless transmission links.

In a further form of embodiment of the controller, the nominal alternating voltage determiner is configured such that the nominal frequency essentially corresponds to the further frequency, if the further electrical energy supply unit is connected to the electrical energy supply unit in an electrically conductive manner. Otherwise, the nominal frequency is essentially determined in consideration of the first filling level.

This form of embodiment has an advantage, in that the controller can synchronize the alternating voltage of the electrical energy supply unit with the alternating voltage of a further electrical energy supply unit, provided that both electrical energy supply units are interconnected in an electrically conductive manner. If no further electrical energy supply unit is connected, the controller, by means of the nominal frequency, can transmit the first filling level of the first energy store of the electrical energy supply unit to a connected load. Certain loads can employ the frequency of the alternating voltage of the electrical energy supply unit, for example to execute the switch-off or switch-on thereof. The controller thus provides loads with a facility for the optimization of the energy use of the electrical energy supply unit.

In a further form of embodiment of the controller, the nominal alternating voltage determiner is configured such that the nominal frequency essentially corresponds to the further frequency, if the further electrical energy supply unit is connected to the electrical energy supply unit in an electrically conductive manner, and if the further filling level exceeds the filling level. Otherwise, the nominal frequency is essentially determined in consideration of the first filling level.

Consequently, where two electrical energy supply units are mutually connected in an electrically conductive manner, the controller of the two controllers, the electrical energy supply unit of which has the higher filling level dictates the nominal frequency of the alternating voltage, and the controller of the two controllers, the electrical energy supply unit of which has a lower filling level, follows the nominal frequency thus dictated. The same applies where more than two energy supply units are interconnected in an electrically conductive manner. Accordingly, the controller can communicate the value of the highest filling level of two or more electrically interconnected electrical energy supply units, in the form of the corresponding nominal frequency of the alternating voltage, to all the other controllers, and also to loads which are connected to the electrically interconnected electrical energy supply units.

Alternatively, the controller of the two controllers, the electrical energy supply unit of which has the lower filling level can also dictate the nominal frequency of the alternating voltage, and the controller of the two controllers, the electrical energy supply unit of which has the higher filling level, follows the nominal frequency thus dictated.

In a particular form of embodiment of the controller, the nominal alternating voltage determiner can consider the first filling level, such that the nominal frequency consistently increases in tandem with the first filling level.

The controller can thus establish the compatibility of the electrical energy supply unit with other macro- or microgrids, which generally operate at an alternating voltage frequency which consistently dips in tandem with the grid load. A high grid load thus corresponds to a low first filling level, and a low grid load corresponds to a high first filling level. This is particularly advantageous in the event of the extension of existing microgrids to include electrical energy supply units which incorporate the controller according to the invention.

In a further particular form of embodiment of the controller, the nominal alternating voltage determiner can consider the first filling level, such that the nominal frequency, at least in one region, is linearly dependent upon the first filling level.

This form of embodiment has an advantage, in that it is particularly easy to implement.

In another form of embodiment of the controller, the nominal alternating voltage determiner can consider the first filling level, such that the nominal frequency, at a first filling level of 0%, can assume a value in the region of 82%-98% of a rated frequency, specifically 84%-96% of the rated frequency, especially 86%-94% of the rated frequency, particularly 88%-92% of the rated frequency, or more particularly 90%-91% of the rated frequency, and wherein a specific rated frequency of 50 Hz or 60 Hz applies.

The rated frequency is to be understood as the frequency which applies, for example, on a macrogrid in normal operation. In Europe, the rated frequency is customarily 50 Hz, and in North America the rated frequency is 60 Hz.

Compatibility with a plurality of different macro- and microgrids is thus achieved.

In yet a further form of embodiment of the controller, the nominal alternating voltage determiner can consider the first filling level such that the nominal frequency, at a first filling level of 100%, essentially corresponds to a rated frequency, wherein the rated frequency can specifically be 50 Hz or 60 Hz.

Compatibility with a plurality of different macro- and microgrids is thus achieved, specifically with those having a rated frequency of 50 Hz and/or 60 Hz.

In yet a further form of embodiment of the controller, the controller can comprise a maximum power regulator for an electrical energy source of the electrical energy supply unit.

A maximum power regulator is a device, whereby the electrical loading of the electrical energy source can be adjusted, such that the maximum possible power can be tapped from the electrical energy source. Regulators of this type will be known per se to a person skilled in the art.

By means of the controller, it can thus be achieved that the first energy store is charged as rapidly as possible, or that the first energy store is subject to minimum loading, wherein the load, in the event of the maximum source capacity of the energy source, is essentially supplied from the energy source, rather than from the first energy store.

It is not absolutely necessary for the maximum power regulator to adjust the electrical loading of the electrical energy source, such that the maximum possible capacity is tapped from the electrical energy source. Operating states are also possible in which the maximum power regulator adjusts the electrical loading of the electrical energy source, such that less than the maximum possible capacity is tapped from the electrical energy source, or even no capacity at all.

In a particular form of embodiment, the controller additionally comprises an excess power input, to which excess power from an electrical energy source is transmittable. The nominal alternating voltage determiner is thus additionally configured, in the event of a first filling level of 100%, to determine the nominal frequency in relation to the excess power.

Excess power is to be understood as the maximum potential capacity of the electrical energy source, minus the actual power output delivered. Excess power can also be expressed in relative terms. 100% excess power signifies a zero power output from the energy source, even though a power output would be possible, in the event of an appropriate load.

The controller can thus transmit information to the load of the electrical energy supply unit, to the effect that excess power is available. Certain loads, which are not time-critical and which have a relatively high energy consumption, such as, for example, cold stores or water pumps which, for example, pump water from a well to a reservoir at a higher altitude, can employ this information in order to execute a switch-on, where excess power is available. The controller thus provides a further option for the optimum use of energy from the electrical energy supply unit.

In a particular form of embodiment of the controller, the nominal alternating voltage determiner can consider the first filling level, such that the nominal frequency consistently rises in tandem with the excess power.

Compatibility with further macro- and microgrids is thus achieved.

In a further particular form of embodiment of the controller, the nominal alternating voltage determiner can consider the first filling level, such that the nominal frequency, at least in one region, is linearly dependent upon the excess power.

This form of embodiment has an advantage, in that it is exceptionally easy to implement.

In a further form of embodiment of the controller, the nominal alternating voltage determiner can consider the first filling level, such that the nominal frequency, in the event of a first filling level of 100%, essentially corresponds to a rated frequency, if the excess power is equal to zero. Alternatively, the nominal frequency, in the event of a first filling level of 100%, can assume a value in excess of 100%, and up to 104% of the rated frequency, if the excess power is at its maximum. Specifically, the rated frequency can be 50 Hz or 60 Hz.

Compatibility with further different macro and microgrids is thus achieved.

In yet a further form of embodiment of the controller, the nominal alternating voltage determiner is additionally designed to determine a nominal r.m.s. value of the nominal alternating voltage, in relation to a filling level differential. The filling level differential is calculated by the deduction of the further filling level from the first filling level.

A filling level differential, specifically in electrical energy supply units which are interconnected in an electrically conductive manner, is essentially undesirable, and should be avoided insofar as possible. In order to be able to influence this filling level differential, the nominal r.m.s. value of the alternating voltage of the electrical energy supply unit is firstly determined in an intermediate step. The nominal r.m.s. value of the alternating voltage can be varied in a number of ways. For example, it is possible to delay or advance the start of a half-wave of the nominal alternating voltage, and/or to delay or advance the end of a half-wave. It is also possible e.g. to vary the amplitude. In an electrical energy supply unit with pulse-width modulation of the alternating voltage, it is possible to vary the pulse widths. The controller thus delivers an intermediate variable, namely, the nominal r.m.s. value of the alternating voltage, in order to permit the filling level differential to be influenced. Moreover, by means of this "nominal r.m.s. value" intermediate variable, a very rapid response to a filling level differential is possible. At a customary rated frequency of 50 Hz or 60 Hz, the duration of a half-wave is essentially 10 ms or 8.3 ms, i.e. the nominal r.m.s. value can be varied every 10 ms or 8.3 ms. A significant variation of the filling level differential generally occupies a few minutes, if it is assumed that island systems customarily complete a full charging-discharging cycle in the course of one day (24 hours).

In a preferred form of embodiment of the controller, the nominal alternating voltage determiner is additionally designed to regulate the nominal r.m.s. value of the nominal alternating voltage, such that the filling level differential converges towards zero.

It is thus achieved that each individual energy store in a network of various electrical energy supply units, in the stationary state, assumes an equal filling level. In turn, this means that all the energy stores are optimally employed, given that, ideally, they all achieve a filling level of zero at the same time. Moreover, the electrical energy supply units, and specifically the energy stores, undergo identical cyclical loading, and are thus essentially subject to the same aging.

In turn, this simplifies the maintenance of the electrical energy supply units, as their service life can be scheduled to expire at the same time and, in consequence, all the electrical energy supply units, or individual components thereof, can be replaced simultaneously.

Advantageously, the nominal alternating voltage determiner can be configured to control the nominal r.m.s. value of the nominal alternating voltage, such that the filling level differential converges towards zero. Control of the nominal r.m.s. value of the nominal alternating voltage can be achieved with no measurement of an alternating voltage on a second terminal of an alternating voltage generator, and specifically with no measurement of an r.m.s. value of the alternating voltage on the second terminal of the alternating voltage generator.

In a preferred form of embodiment of the controller, the nominal alternating voltage determiner is additionally configured to determine the nominal r.m.s. value of the nominal alternating voltage, in accordance with a current output from an alternating voltage generator.

The current output of the alternating voltage generator can thus be regulated or controlled in relation to the filling level differential.

The current output of the alternating voltage generator preferably flows through a second terminal of the alternating voltage generator.

In a preferred form of embodiment of the controller, the nominal alternating voltage determiner is additionally configured to set the nominal alternating voltage for at least one nominal alternating voltage cycle to zero, if an overvoltage occurs within the alternating voltage generator.

This has an advantage in that, for example, in the event of load shedding on an electrical energy supply unit, a current delivered by the alternating voltage generator can immediately be switched-out and/or can only be switched back in upon the expiry of a given time interval of one or more nominal alternating voltage cycles.

Advantageously, the voltage can be measured on an intermediate circuit within the alternating voltage generator. This permits a measurement of the alternating voltage of the alternating voltage generator to be omitted.

In a further preferred form of embodiment of the controller, the nominal alternating voltage determiner additionally comprises a load power input, to which a load power of a load which is connected to the electrical energy supply unit is transmittable. Moreover, the nominal alternating voltage determiner specifically additionally comprises a generator power input, to which a generator power delivered by the alternating voltage generator of the electrical energy supply unit is transmittable. The nominal alternating voltage determiner is additionally configured to determine the nominal r.m.s. value such that the generator power is greater than the load power, if the first filling level is greater than the further filling level. Moreover, the nominal alternating voltage determiner is additionally configured to determine the nominal r.m.s. value, such that the generator power is smaller than the load power, if the first filling level is smaller than the further filling level. Moreover, the nominal alternating voltage determiner is additionally configured to determine the nominal r.m.s. value, such that the generator power is equal to the load power, if the first filling level corresponds to the further filling level.

The controller can control the electrical energy supply unit, such that the further electrical energy supply unit, depending upon its further filling level, either sheds load or is additionally loaded. For example, load distribution between the electrical energy supply units can proceed such that the electrical energy supply unit having an energy store with a greater capacity, for example on the grounds of its less advanced state of aging, is loaded to a greater extent than an electrical energy supply unit having an energy store with a smaller capacity.

A load distribution between various electrical energy supply units which are interconnected in an electrically conductive manner can thus be achieved, as a result of which all the filling levels are balanced in time.

In a further form of embodiment, the controller additionally comprises an interchange power input, to which an interchange power which flows from the electrical energy supply unit to the further electrical energy supply unit is transmittable. Moreover, the controller specifically additionally comprises a circuit-breaker, which is designed to establish an electrically conductive connection between the electrical energy supply unit and the further electrical energy supply unit, and to interrupt the electrically conductive connection, if either the interchange power is lower than zero and the first filling level is equal to or lower than a first predefined filling level threshold value, or the interchange power is greater than zero and the first filling level is equal to or lower than a second predefined filling level threshold value.

This form of embodiment has an advantage, in that various protection options are available for the electrical energy supply unit, specifically the energy store thereof. Firstly, this form of embodiment provides protection against exhaustive discharge. Secondly, the load is pro- tected vis-à-vis the further electrical energy supply unit, in the event that the further electrical energy supply unit draws power from the electrical energy supply unit over a prolonged period, such that a first filling level threshold value is achieved or undershot.

A further advantage is constituted by a protection option for the further electrical energy supply unit, wherein the further electrical energy supply unit, for example, is protected against a defective load on the electrical energy supply unit.

Once the fault has been cleared, the circuit-breaker can be reclosed manually, or released for reclosing by the controller.

In a further form of embodiment, the controller additionally comprises an optical and/or acoustic indicator, which is designed to generate a warning signal, if the electrically conductive connection between the electrical energy supply unit and the further electrical energy supply unit was interrupted by the circuit-breaker.

By means of this optical and/or acoustic indicator, it is very easy for an operator to identify the controller which has been affected by protective tripping. Fault identification and fault clearance by the operator are supported accordingly.

In a further form of embodiment, the circuit-breaker is configured such that the first predefined filling level threshold value is greater than the second predefined filling level threshold value.

It is thus achieved that the protection of a network of further electrical energy supply units is deployed at a higher first filling level of the electrical energy supply unit than the protection of the electrical energy supply unit vis-à-vis the network of further electrical energy supply units.

In a further form of embodiment, the nominal alternating voltage determiner is designed to determine a nominal frequency which corresponds to a network frequency of a public electricity supply network, where the electrical energy supply unit is connected to the public electricity supply network in an electrically conductive manner.

Although the controller according to the invention can control the electrical energy supply unit in the absence of a connection to the public electricity supply system (macrogrid), a connection and synchronization of the electrical energy supply unit with a public electricity supply system is possible. Accordingly, additional electrical energy can be provided in order, for example, to raise the first filling level of the first energy store. Alternatively, the electrical energy supply unit can deliver energy to the public electricity supply network. Connection of the electrical energy supply unit to the public electricity supply network is executed such that a flux of electricity from the public electricity supply network to the electrical energy supply unit, or vice versa, is possible.

In a further form of embodiment, the controller additionally comprises a data memory for the storage of operating data of the electrical energy supply unit.

Operating data of the energy supply unit can include data on the individual components of the electrical energy supply unit such as, for example, the source capacity, the excess power, the first filling level, the load power, the interchange power and/or the generator power. Operating data of the energy supply unit can also include the further filling level, which is transmitted by the further electrical energy supply unit to the controller.

The source capacity is the actual power which is delivered by the electrical energy source of the electrical energy supply unit.

The data memory permits a subsequent evaluation or further application of the saved operating data. This is advantageous with respect to the optimization of control.

In an advantageous form of embodiment, the controller additionally comprises a forecast unit for the forecasting of a first future filling level and/or of a further future filling level.

In the knowledge of the first future filling level and/or of the further future filling level, further optimizations can be applied to the operation of the controller according to the invention, as will be demonstrated hereinafter.

In a further advantageous form of embodiment of the controller, the forecast unit employs operating data from the data memory for the forecasting of the first future filling level and/or of the further future filling level.

Specifically in the event of consistently recurring operating patterns, it is advantageous to employ operating data from the past, which have been saved in a memory, in order to forecast the first future filling level. This permits the achievement of exceptionally high accuracy and reliability. For the use of operating data from the data memory, learning algorithms such as, for example, neural networks, can also be employed.

The controller can also be configured to recognize predefined load patterns, and to consider these patterns in the determination of the nominal frequency.

In a further form of embodiment, the controller additionally comprises a transmitter unit for the transmission of operating data, specifically operating data from a data memory, to an external database and/or to an external computer.

The transmission of operating data to the external database and/or to the external computer provides an advantage, in that the computer and/or the database can execute further evaluations and/or further processing of the operating data, including, for example, invoice generation.

In a particularly advantageous form of embodiment of the controller, the nominal alternating voltage determiner is additionally configured to determine the nominal alternating voltage, in consideration of a first future filling level and/or of a further future filling level.

Capacity utilization of the first energy store of the electrical energy supply unit is thus improved, as forecast future filling levels, rather than current filling levels, are employed for the control of the electrical energy supply unit.

A further aspect of the present invention relates to an electrical energy supply unit comprising a controller according to the invention, a first energy store and an alternating voltage generator having a first terminal and a second terminal. The first terminal of the alternating voltage generator is connected to the first energy store in an electrically conductive manner. The alternating voltage generator is designed to generate an alternating voltage which corresponds to a nominal alternating voltage on the second terminal.

An energy store is to be understood as a store for electrical energy.

An alternating voltage generator is to be understood as any converter which is capable of generating an alternating voltage.

Rated values for the alternating voltage can be, for example, 120 V/60 Hz and/or 230 V/50 Hz.

The continuous output of the alternating voltage generator can lie within the range of 1 W to 1 MW, specifically from 10 W to 10 KW, particularly from 100 W to 500 W, and more particularly from 200 W to 300 W.

Even in the absence of a connection to a public electricity supply network (macrogrid), the electrical energy supply unit according to the invention can deliver an alternating voltage which essentially corresponds to an alternating voltage from a public electricity supply network.

The electrical energy supply unit according to the invention can be simply installed, even by a non-specialist. Moreover, the electrical energy supply unit, on the alternating voltage side, for example on its second terminal, can be connected to one or more further electrical energy supply units in an electrically conductive manner, such that a network of parallel-connected electrical energy supply units can be constituted. This means that the network can be expanded as required, from a single electrical energy supply unit up to any desired and unlimited number of electrical energy supply units.

In a further form of embodiment of the electrical energy supply unit, the first energy store can assume a voltage, which is essentially a DC voltage.

This can simplify interaction with other components of the electrical energy supply unit, where the latter also operate with DC voltages.

In a further form of embodiment of the electrical energy supply unit, the first energy store is an electrochemical energy store.

Electrochemical energy stores are commercially available in large numbers for the widest variety of conditions of application, and can consequently be employed in the electrical energy supply unit in an economically advantageous manner.

In a further form of embodiment of the electrical energy supply unit, the first energy store is a fuel cell.

As fuels cells are environment-friendly and generally maintenance-free, they can be advantageously employed in the electrical energy supply unit. Provided that the fuel required in-service by the fuel cell is available, a first filling level of 100% can additionally be assumed.

In a further form of embodiment of the electrical energy supply unit, the first energy store is rechargeable.

This is specifically advantageous if the electrical energy supply unit is provided with an energy source, the electrical energy of which can then be stored in the first energy store.

In a further form of embodiment of the electrical energy supply unit, the first energy store comprises one or more primary cells of the Li-ion, Li-polymer, Li-manganese, Li-iron phosphate, lithium-air, Li-titanate, Li-sulfur, Na—NiCl, Na—S, Na-ion, Ni—Cd, Ni—Fe, Ni—$H_2$, Ni-MH, Ni-ZN and/or lead acid type.

Primary cells of the above-mentioned type can advantageously be employed, as they are manufactured in large numbers, and are economically attractive.

In a further form of embodiment of the electrical energy supply unit, the first energy store is a maintenance-free and/or low-maintenance lead acid battery.

Lead acid batteries are produced in particularly large numbers and in multiple variants, specifically including variants for cyclical loading, on the grounds of which they can be particularly advantageously employed in the electrical energy supply unit according to the invention. Moreover, standards are in place for lead acid batteries, such that the specification thereof is particularly straightforward, and replacement lead acid batteries are readily available.

By the use of maintenance-free or low-maintenance lead acid batteries, for example valve-regulated lead acid batteries of the VRLA type (valve regulated lead acid) and/or sealed lead acid batteries of the SLA type (sealed lead acid), servicing costs for the electrical energy supply unit are additionally reduced.

Lead acid batteries with OPzS electrodes can be employed, as they have a comparatively long service life, and are therefore exceptionally cost-effective.

In a further form of embodiment of the electrical energy supply unit, the first energy store comprises a number ranging from 3 to 24, specifically 4, 6, 8, 10, 12 or 20 series-connected primary cells.

This permits the adaptation of voltage to the requirements of the alternating voltage generator and/or of the electrical energy source.

In a further form of embodiment, the electrical energy supply unit can additionally comprise a filling level detector for the determination of a first filling level of the first energy store.

The electrical energy supply unit is thus rendered independent of any communication of the first filling level by another pathway or in another manner. Filling level detectors for a variety of energy stores are known, specifically for lead acid batteries.

In a further form of embodiment of the electrical energy supply unit, the filling level detector is configured, upon the determination of the first filling level, to consider one or more operating data variables of the first energy store.

The accuracy of the filling level detector can thus be improved.

In a further form of embodiment of the electrical energy supply unit, operating data for the first energy store can be selected from the following group: electrical voltage of the first energy store, current balance of the first energy store, temperature of the first energy store, internal resistance of the first energy store and/or electrolyte concentration of the first energy store.

If the filling level detector considers the above-mentioned operating data for the first energy store, its accuracy can be further improved.

In a further form of embodiment, the electrical energy supply unit additionally comprises an electrical energy source, which is connectable to the first energy store in an electrically conductive manner.

By means of an energy source, the time during which the electrical energy supply unit can deliver electrical energy can be prolonged.

In a further form of embodiment of the electrical energy supply unit, the electrical energy source can carry and/or generate an electrical voltage which is essentially a DC voltage.

This can simplify interaction with other components of the electrical energy supply unit, where the latter also operate with DC voltages.

In a further form of embodiment of the electrical energy supply unit, the electrical energy source can be operated using renewable energies.

Accordingly, the energy source, and thus also the electrical energy supply unit, is independent of the presence and/or the delivery of, for example, fossil fuels.

In a further form of embodiment of the electrical energy supply unit, renewable energies can be selected from the following group: solar power, wind power, water power, tidal power, geothermal energy and/or bioenergy.

The above-mentioned group of renewable energies shows good availability, and can thus be advantageously employed by an electrical energy source of the electrical energy supply unit according to the invention.

In a further form of embodiment of the electrical energy supply unit, the electrical energy source is a photovoltaic solar panel.

Photovoltaic solar panels are commercially available in a wide variety of models, are attractively priced, durable and maintenance-free.

In a further form of embodiment, the electrical energy supply unit additionally comprises a voltage converter, which is electrically connected on the input side to the electrical energy source, and on the output side to the first energy store.

An adjustment of the voltage of the electrical energy source to the voltage of the first energy store can thus be achieved. Moreover, by means of the voltage converter, for example, a working point of the electrical energy source can be set.

In a further form of embodiment of the electrical energy supply unit, the voltage converter is a DC voltage converter.

This can simplify interaction with other components of the electrical energy supply unit, where the latter also operate with DC voltages.

In a further form of embodiment of the electrical energy supply unit, the voltage converter is configured such that a source capacity which is deliverable by the electrical energy source can achieve its maximum value.

The source capacity which is deliverable by an electrical energy source can thus achieve its maximum value, for example, if a maximum power regulator of the controller controls and/or regulates the voltage converter.

It can thus be achieved that the first energy store is charged as rapidly as possible, or that the first energy store is subject to minimum loading, given that the load, if the maximum source capacity is available, is essentially supplied by the energy source rather than by the first energy store.

In a further form of embodiment of the electrical energy supply unit, the alternating voltage generator is exclusively configured for a unidirectional energy flux from the first terminal to the second terminal.

The alternating voltage generator can thus be simply and cost-effectively manufactured. In a further form of embodiment of the electrical energy supply unit, the alternating voltage generator is a DC-AC voltage converter.

The alternating voltage generator can thus be exceptionally simply and cost-effectively manufactured.

In a further form of embodiment of the electrical energy supply unit, the DC-AC voltage converter comprises a step-up converter.

A step-up converter is a device for raising a DC voltage, and is also described as a boost converter.

Variations in the voltage on the first energy store and/or in the alternating voltage on the alternating voltage generator can be compensated accordingly.

In a further form of embodiment of the electrical energy supply unit, the DC-AC voltage converter comprises an inverter having a transformer.

Galvanic isolation between the electrical energy source and the first energy store on one side, and the alternating voltage on the second terminal of the alternating voltage generator on the other side can thus be ensured, thereby contributing to the safety of the electrical energy supply unit.

In a further form of embodiment of the electrical energy supply unit, the second terminal is connectable to a load.

One or more loads can be directly connected to the electrical energy supply unit, which is not only practical, but also reduces the complexity of installation, as the electrical energy supply unit can, in principle, be decentrally located, i.e. in direct proximity to the load.

In a further form of embodiment of the electrical energy supply unit additionally comprises a charging device which, on the input side, is connectable to an electricity supply network and, on the output side, is connected to the first energy store.

The charging device provides an advantage, in that the first energy store is not only chargeable from the energy source, but also from a public electricity supply network, provided that the latter is connected to the electrical energy supply unit.

In a further form of embodiment of the electrical energy supply unit, the charging device is connectable, on the input side, to the second terminal of the alternating voltage generator (50).

Provided that the electrical energy supply unit is connected to a further electrical energy supply unit in an electrically conductive manner, thereby constituting an island network, as further described hereinafter, the charging device can tap electrical energy from the island network and inject said energy into the first energy store, as a result of which the first filling level can be raised. A quantity of energy corresponding to the tapped energy can be injected, for example, from the further electrical energy supply unit into the island network. The energy thus injected can either originate from an electrical energy source of the further electrical energy supply unit, or from a public electricity supply network which is connected, for example, to the further electrical energy supply unit. Accordingly, the first filling level of the first energy store of the electrical energy supply unit can be raised, even if the electrical energy supply unit does not have access to a dedicated electrical energy source.

In a further form of embodiment, the electrical energy supply unit additionally comprises an internal resistance, which is dimensioned such that the alternating voltage, where the rated capacity is available on the electrical energy supply unit, lies in the region of 90 to 98% of the rated voltage, particularly in the region of 90 to 95% of the rated voltage, and more particularly in the region of 90 to 92% of the rated voltage.

This permits a passive load distribution between a plurality of electrical energy supply units which are mutually interconnected in an electrically conductive manner. At the same time, compliance with voltage ranges defined under applicable standards, such as a ±10%, margin on the rated voltage, is observed.

The internal resistance can, for example, be simulated wherein an r.m.s. value of the alternating voltage is controlled in relation to a current output of the alternating voltage generator. This has an advantage, in that the efficiency of the electrical energy supply unit is very high, even though the internal resistance observed on the second terminal is relatively large.

In a further form of embodiment, the electrical energy supply unit additionally comprises a stackable housing.

A plurality of electrical energy supply units according to the invention can thus be installed or erected in one location, in an exceptionally simple and space-saving manner.

Specifically, the housing, in the region of an underside and/or a top side, incorporates a structural feature, specifically at least one projection, a recess and/or a cut-out. The underside is specifically a standing surface of the housing of the energy supply unit, which specifically assumes a horizontal orientation. The top side is typically a side of the housing which is arranged in a coplanar position to the underside.

Structural features of this type can prevent any slippage of the housing on a ground surface. Moreover, a secure stacking of a plurality of electrical energy supply units can thus be achieved.

In a specifically preferred arrangement, the underside of the housing incorporates at least one structural feature, and the top side incorporates at least one further structural feature. Advantageously, the at least one structural feature on the underside is configured in a complementary manner to the at least one structural feature on the top side. Specifically, upon the stacking of two electrical energy supply units, the at least one structural feature, e.g. a projection, on the top side of the housing of the electrical energy supply unit engages with the at least one structural feature, e.g. a recess, on the underside of the housing of the further electrical energy supply unit.

Electrical energy supply units can thus be stacked in an exceptionally positive and stable manner.

The present invention further relates to an electrical energy supply system comprising an electrical energy supply unit according to the invention and at least one further electrical energy supply unit according to the invention, wherein the electrical energy supply unit and the further electrical energy supply unit are mutually interconnected in an electrically conductive manner. Specifically, the further electrical energy supply unit is an electrical energy supply unit according to the invention.

In an electrical energy supply system according to the invention, any desired island system (microgrid) can be constituted, without the necessity for any prior application-specific design. The island system constituted by the electrical energy supply system according to the invention can expand in accordance with requirements, such that unnecessarily high investment costs are avoidable. Upon each extension by the addition of electrical energy supply units according to the invention, all the existing electrical energy supply units will continue to be usable. Accordingly, each extension can be incorporated at any desired location, in a decentralized manner. It is also possible for initially separately operated island systems to be interconnected at a preferred subsequent time point, and thus combined to constitute a larger island system. In every regard, an island system, or an electrical energy supply system according to the invention is thus highly flexible and cost-effective. Moreover, the failure of one electrical energy supply unit of the electrical energy supply system does not result in the failure of the entire electrical energy supply system, thereby permitting the achievement of extraordinarily high reliability and availability.

The electrical energy supply units of an electrical energy supply system can be connected in an electrically conductive manner via the second terminals of the alternating voltage generators of the electrical energy supply units.

In a further form of embodiment of the electrical energy supply system, the electrical energy supply unit and the further electrical energy supply unit are mutually electrically interconnected in parallel.

The installation of an electrical energy supply system according to the invention is thus exceptionally easy.

A further object of the invention is a method for controlling an inventive electrical energy supply unit comprising the following steps: a) determination of a nominal alternating voltage, in consideration of a first filling level of a first energy store of the electrical energy supply unit and/or of a further filling level of a further energy store of a further electrical energy supply unit, and b) transmission of the nominal alternating voltage to an alternating voltage generator of the electrical energy supply unit.

The controller and the electrical energy supply unit are specifically defined as described heretofore. Specifically, in the method according to the invention, the process steps and/or functions described in conjunction with the controller and with the mode of operation of the electrical energy supply unit are executed.

By means of the method according to the invention for the control of an electrical energy supply unit, it is possible to control a plurality of electrical energy supply units, in the absence of a central controller.

Further advantageous forms of embodiment and combinations of characteristics of the invention proceed from the following detailed description, and from the entirety of the patent claims.

BRIEF DESCRIPTION OF THE DRAWINGS

Drawings employed for the illustration of exemplary embodiments are as follows:

In principle, identical components are identified in the figures by the same reference numbers.

FIG. 1 shows a controller 10 according to the invention for an electrical energy supply unit. In service, the controller 10 is connected to the electrical energy supply unit by a signal connection, such that operating data can be transmitted from the controller 10 to the electrical energy supply unit and vice versa. The signal connection of the controller 10 with the electrical energy supply unit is not designed to transmit electrical energy in a quantity which exceeds the requirements of a data signal transmission function. The signal connection of the controller 10 with the electrical energy supply unit can be configured in the form of signal lines, or can be executed optically or wirelessly. The controller 10 comprises a first filling level input 11, to which a first filling level 41 of a first energy store of the electrical energy supply unit is transmitted in service. A further filling level 141 of an optional further energy store of a further electrical energy supply unit is transmitted to a further filling level input 12 of the controller 10. The controller 10 moreover comprises a nominal alternating voltage determiner 13 having a nominal alternating voltage output 15. Both inputs of the controller 10, the first filling level input 11 and the further filling level input 12, are connected to the nominal alternating voltage determiner 13. In service, the nominal alternating voltage output 15 is connected to an alternating voltage generator of the electrical energy supply unit, such that a nominal alternating voltage 14 determined by the nominal alternating voltage determiner 13 is transmitted to the alternating voltage generator. The nominal alternating voltage determiner 13 determines the nominal alternating voltage 14 in consideration of the first filling level 41 and/or of the further filling level 141. In service, the alternating voltage generator generates an alternating voltage which corresponds to the nominal alternating voltage 14, and is made available, for example, to a load which is connected to the electrical energy supply unit.

FIG. 2 represents one form of embodiment in an operating state in which the nominal alternating voltage determiner 13 determines a nominal frequency 16 of the nominal alternating voltage 14 in relation to the first filling level 41. FIG. 2 shows exemplary values for a rated frequency of 50 Hz. For a rated frequency of 60 Hz (not represented), values can be extrapolated from the exemplary values for 50 Hz, for example in a linear manner. At a rated frequency of 50 Hz and a first filling level of 0%, the nominal alternating voltage determiner 13 determines a nominal alternating voltage 14 with a nominal frequency 16 of 45.5 Hz. At a first filling level 41 of 100%, the nominal alternating voltage determiner 13 determines a nominal alternating voltage 14 having a nominal frequency 16 of 50 Hz, which corresponds to the rated frequency. The nominal frequency 16 rises in a constant and linear manner in relation to the first filling level 41.

FIG. 3 represents one form of embodiment in an operating state in which the nominal alternating voltage determiner 13, at a filling level of 100%, determines the nominal frequency 16 of the nominal alternating voltage 14 in relation to an excess power 81. FIG. 3 shows exemplary values for a rated frequency of 50 Hz. At a rated frequency of 60 Hz (not represented), values can be extrapolated from the exemplary values for 50 Hz, for example in a linear manner. At a rated frequency of 50 Hz and an excess power 81 of 0%, the nominal alternating voltage determiner 13 determines a nominal alternating voltage 14 having a nominal frequency 16 of 50 Hz, which in turn corresponds to the rated frequency. At an excess power 81 of 100%, the nominal alternating voltage determiner 13 determines a nominal alternating voltage 14 having a nominal frequency 16 of 52

Hz. The nominal frequency 16 rises in a constant and linear manner in relation to the excess power 81.

Figure 1:
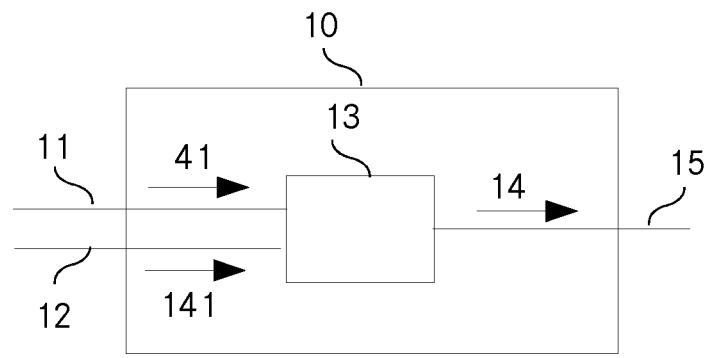
FIG. 1 shows a controller according to the invention.
Figure 2:
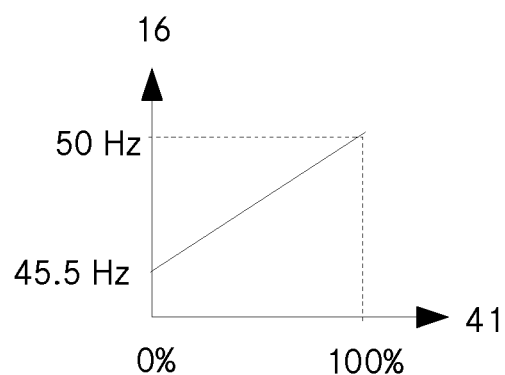
FIG. 2 shows a relationship of the nominal frequency to the first filling level.
Figure 3:
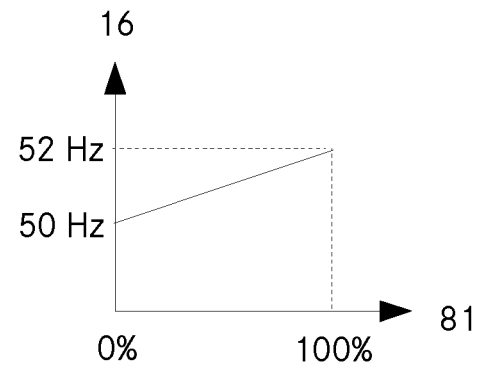
FIG. 3 shows a relationship of the nominal frequency to the excess power.

The relationship of the nominal frequency 16 to the first filling level 41 represented in FIG. 2 and the relationship of the nominal frequency 16 to the excess power 81 represented in FIG. 3 (at a filling level of 100%) are specifically employed by the nominal alternating voltage determiner 13 if the electrical energy supply unit having the controller 10 according to the invention, in service, is connected to a load only, but not to a further electrical energy supply unit and not to a public electricity supply network. In this operating state, a nominal r.m.s. value of the nominal alternating voltage 14 is determined by the nominal alternating voltage determiner 13 such that the capacity delivered by the electrical energy supply unit essentially corresponds to that of the load which is connected to the electrical energy supply unit.

Conversely to the signal connection between the controller 10 and the electrical energy supply unit, the electrically conductive connection between the electrical energy supply unit and a load which is connected thereto is a power link, which is designed for the transmission of electrical energy. Likewise, the connection between the electrical energy supply unit and the further electri- cal energy supply unit, or between electrical energy supply units in general, is always a power link. A power link can also be employed for the transmission of data signals, in addition to the trans- mission of energy.

If, additionally, a further electrical energy supply unit is present, it is not essential that the two energy stores of the two electrical energy supply units should assume the same filling level. The first filling level 41 of the first energy store of the electrical energy supply unit may differ from the further filling level 141 of the further energy store of the further electrical energy supply unit. Consequently, the two nominal alternating voltage determiners can likewise determine different nominal frequencies for the two electrical energy supply units; for example, the nominal alternating voltage determiner 13 of the controller 10 of the electrical energy supply unit determines a nominal frequency 16 which differs from a further nominal frequency of the further electrical energy supply unit. If only such electrical energy supply units operating at different nominal frequencies were to be interconnected in an electrically conductive manner, for example in the form of a parallel circuit, the resulting operating state would be undesirable. In order to avoid this, one electrical energy supply unit is synchronized with the other electrical energy supply unit. For example, the controller 10 is configured, from a further frequency of a further alternating voltage of a further alternating voltage generator of the further electrical energy supply unit, to determine the further filling level of the further energy store. To this end, the controller 10 of the electrical energy supply unit is connected to the further alternating voltage of the further alternating voltage generator of the further electrical energy supply unit via a signal connection. At this time, however, the alternating voltage of the alternating voltage generator of the electrical energy supply unit is not yet connected to the further alternating voltage of the further alternating voltage generator of the further electrical energy supply unit via a power link, such that the unwanted operating state is prevented. The nominal alternating voltage determiner 13 now determines the nominal frequency 16 in relation to the further filling level 141. Consequently, the electrical energy supply unit now generates an alternating voltage at a frequency which essentially coincides with the further frequency of the further alternating voltage of the further electrical energy supply unit. The two alternating voltages of the two alternating voltage generators can now also be mutually interconnected in an electrically conductive manner via a power link, for example in the form of a parallel circuit, without the occurrence of the unwanted operating state.

At all times, the controller 10 according to the invention ensures that the zero-crossings of alternating voltages occur simultaneously, at the same frequency.

Figure 4:
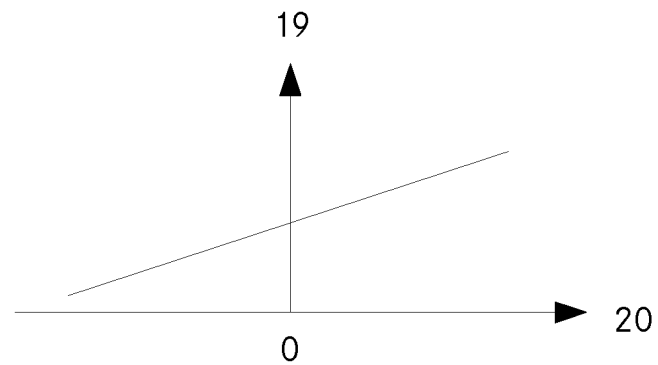
FIG. 4 shows a relationship of the nominal r.m.s. value to the filling level differential.

FIG. 4 represents one form of embodiment in an operating state, in which a nominal r.m.s. value 19 of the nominal alternating voltage 14 is determined in relation to the filling level differential 20, wherein the filling level differential 20 is calculated from the first filling level 41, minus the further filling level 141. This operating state can occur if the electrical energy supply unit is connected to a further electrical energy supply unit in an electrically conductive manner via a power link, for example in the form of a parallel circuit arrangement of the electrical energy supply unit with the further electrical energy supply unit. In the specific case where the filling level differential 20 is equal to zero (point of intersection of the axes in FIG. 4), the nominal r.m.s. value 19 of the nominal alternating voltage is determined, as described above, such that the power output from any electrical energy supply unit essentially covers the load which is connected to the respective electrical energy supply unit. If the filling level differential 20 assumes a positive value, i.e. the first filling level 41 is greater than the further filling level 141, the nominal r.m.s. value 19 of the nominal alternating voltage of the electrical energy supply unit is increased (right-hand half of FIG. 4) and, provided that there is no variation in loads, the further nominal r.m.s. value of the further nominal alternating voltage of the further electrical energy supply unit is correspondingly reduced (see left-hand half of FIG. 4). Consequently, the electrical energy supply unit having the higher filling level is additionally loaded, while load is shed from the electrical energy supply unit having the lower filling level. The behavior of the electrical energy supply units is "mutually supportive". This results in an accelerated decline in the first (higher) filling level 41, whereas the further (lower) filling level 141 declines less rapidly, does not decline at all, or even increases, until such time as both filling levels are equal. The filling level differential thus declines over time, until it eventually reaches zero. The further controller of the further energy supply unit thus behaves as if it were connected to a load only, but not to a further energy supply unit, and varies its further nominal frequency in accordance with its further filling level 141. This means that, over time, not only the filling levels are equalized, i.e. the first filling level 41 and the further filling level 141, but also the nominal frequencies, i.e. the first nominal frequency 16 and the further nominal frequency.

Figure 5:
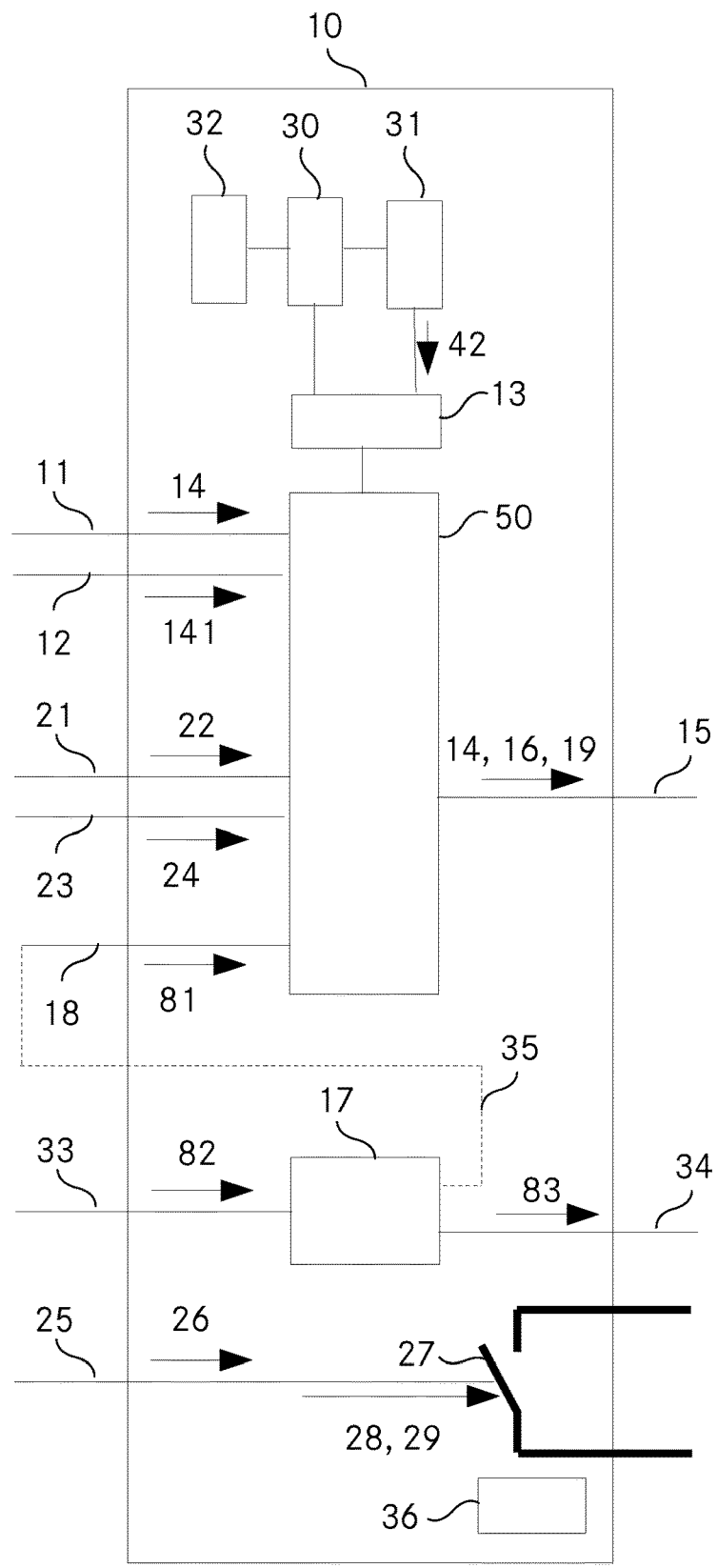
FIG. 5 shows a further controller.

FIG. 5 represents a form of embodiment of the controller 10 according to the invention having a maximum power regulator 17. From an electrical energy source of the electrical energy supply unit, in service, an actual source capacity 82 is transmitted to the maximum power regulator 17 via a constituent actual source capacity input 33 of the controller 10. The maximum power regulator 17 varies the nominal source capacity 83 on a constituent nominal source capacity output 34 of the controller 10, such that the source capacity delivered by the energy source achieves its maximum value. Depending upon the electrical energy source, the nominal source capacity output 34 of the maximum power regulator 17 can be connected to a voltage converter of the electrical energy supply unit via a signal connection, such that the voltage converter can set the requisite voltages and currents for a maximum source capacity of the electrical energy source.

FIG. 5 further represents a form of embodiment of the controller 10 having an excess power input 18 which is connected to the nominal alternating voltage generator 13 via a signal connection, such that the excess power 81 can be transmitted to the nominal alternating voltage generator 13.

In a particular form of embodiment, the excess power 81 can be determined by the maximum power regulator 17 and transmitted by the maximum power regulator 17 to the nominal alternating voltage generator 13, as represented by the excess power signal connection 35 in the form of a broken line. Excess power can occur, if the maximum power regulator 17 regulates the nominal source capacity on the nominal source capacity output 34 such that the source capacity delivered by the energy source does not correspond to the maximum potential capacity, but to a lower capacity.

FIG. 5 further represents a form of embodiment of the controller 10 having a load power input 21 which is connected to the nominal alternating voltage generator 13 such that the load power 22 can be transmitted to the nominal alternating voltage generator 13. The controller 10 further comprises a generator power input 23, which is connected to the nominal alternating voltage generator 13 such that the generator power 24 can be transmitted to the nominal alternating voltage generator 13.

FIG. 5 further represents a form of embodiment of the controller 10, in which a nominal alternating voltage 14 is available on the nominal alternating voltage output 15, having a nominal frequency 16 and a nominal r.m.s. value 19.

Moreover, FIG. 5 represents a form of embodiment of the controller 10 having an interchange power input 25, which is connected to a circuit-breaker 27 (represented in the open state) via a signal connection, such that the interchange power 26 can be transmitted to the circuit-breaker 27. Likewise, a first predefined filling level threshold value 28 and a second predefined filling level threshold value 29 can be transmitted to the circuit-breaker 27. The circuit-breaker 27 can constitute a power link (represented in bold) between the electrical energy supply unit and the further electrical energy supply unit (in the unrepresented switched-on state). If the electrical energy supply unit, with the circuit-breaker 27 closed, draws an electrical interchange power 26 from the further electrical energy supply unit, and the first filling level 41 nevertheless declines, such that it achieves or undershoots a first predefined filling level threshold value 28, a defective load on the electrical energy supply unit is assumed, and the circuit-breaker 27 trips. This means that the electrical energy supply unit is sacrificed, in order to obviate any unnecessary further loading of the further electrical energy supply unit. If the electrical energy supply unit, with the circuit-breaker 27 closed, delivers an electrical interchange power 26 to the further electrical energy supply unit, and the first filling level 41 declines such that it achieves or undershoots a second predefined filling level threshold value 29, a defective load on the further electrical energy supply unit is assumed, and the circuit-breaker 27 trips. This means that the electrical energy supply unit protects itself, in order to prevent any unnecessary further loading from the further electrical energy supply unit.

In a further form of embodiment, the above-mentioned error state, as shown in FIG. 5, can be represented by an indicator 36, wherein the indicator 36 generates an optical and/or acoustic warning signal, for example by means of a flashing light, specifically such as an LED, or by a color change of a light from green to yellow or red and/or by an acoustic signal such as, for example, a bleep.

Immediately the error state has been cleared by a user, said user can enter an acknowledgement on the controller 10, such that the circuit-breaker 27 can be reclosed.

FIG. 5 further represents forms of embodiment of the controller 10 having a data memory 30, a forecast unit 31 and/or a transmitter unit 32. The data memory 30, the forecast unit 31 and/or the transmitter unit 32 can be conventional devices. The data memory is connected via a signal connection inter alia to the nominal alternating voltage determiner 13, in order to access operating data and to permit the storage thereof. The transmitter unit 32 is connected via a signal connection inter alia to the data memory. The forecast unit 31 is connected via a signal connection inter alia to the data memory, and delivers the first future filling level 42 to the nominal alternating voltage determiner 13.

Figure 6:
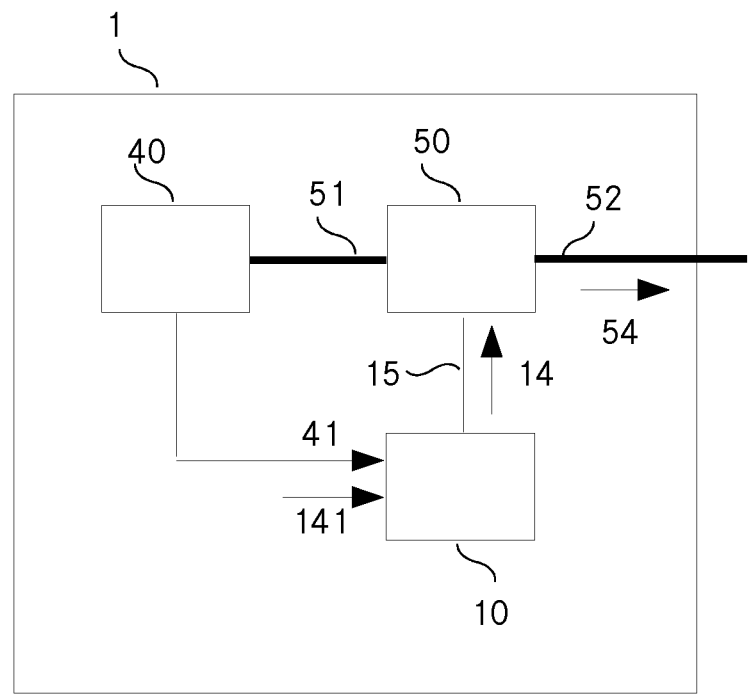
FIG. 6 shows an electrical energy supply unit according to the invention.

FIG. 6 represents an electrical energy supply unit 1 according to the invention. A first energy store 40, e.g. a valve-regulated lead acid battery of the VRLA type, is connected via a power link (shown in bold) to a first terminal 51 of an alternating voltage generator 50 in an electrically conductive manner. The nominal alternating voltage output 15 of the controller 10 according to the invention is connected via a signal connection (represented in light print) to the alternating voltage generator 50, which delivers an alternating voltage 54 in accordance with the nominal alternating voltage 14 to the second terminal 52, to which a load (not represented) or a further energy supply unit (not represented) can be connected via a power link (shown in bold).

The first energy store 40 can be configured to transmit the first filling level 41 to the controller 10.

The optional further filling level 141 can be transmitted, for example, from the further electrical energy supply unit by means of the transmitter unit 32 (see FIG. 5) to the nominal alternating voltage determiner 13 (see FIG. 5) of the controller 10.

Figure 7:
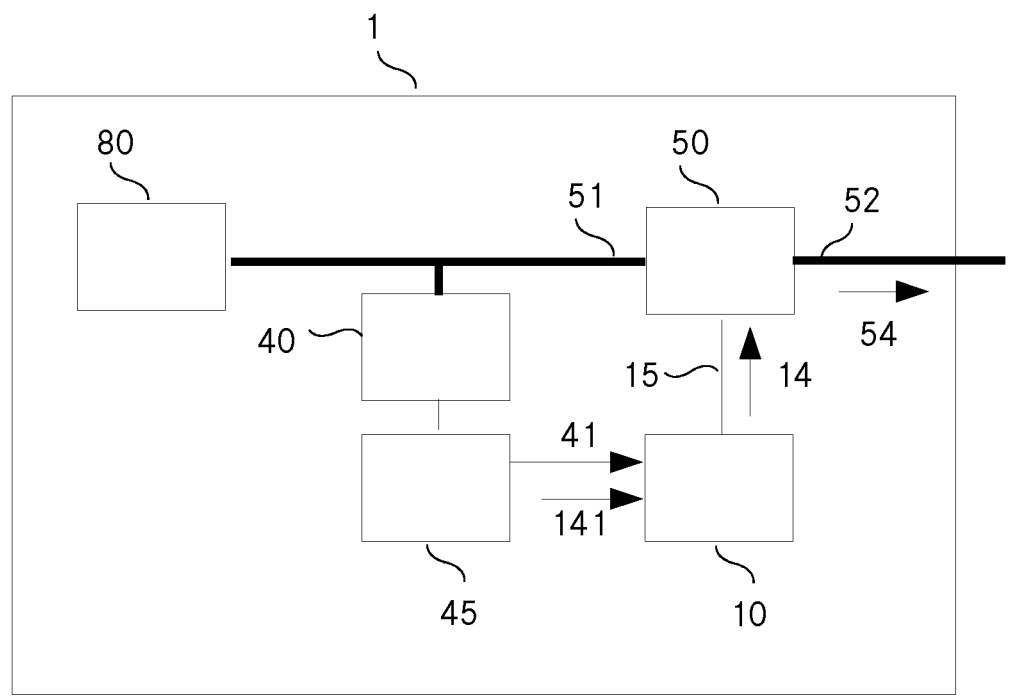
FIG. 7 shows a first extended electrical energy supply unit.

FIG. 7 represents a form of embodiment of the electrical energy supply unit 1 having a filling level detector 45. Via a signal connection (shown in light print), the filling level detector 45 can source operating data from the energy store 40 and determine the first filling level 41, which is then transmitted to the controller 10.

FIG. 7 additionally represents a form of embodiment of the electrical energy supply unit having an electrical energy source 80, e.g. a photovoltaic solar panel. The electrical energy source 80 is connected to the first energy store 40 via a power link (shown in bold).

Figure 8:
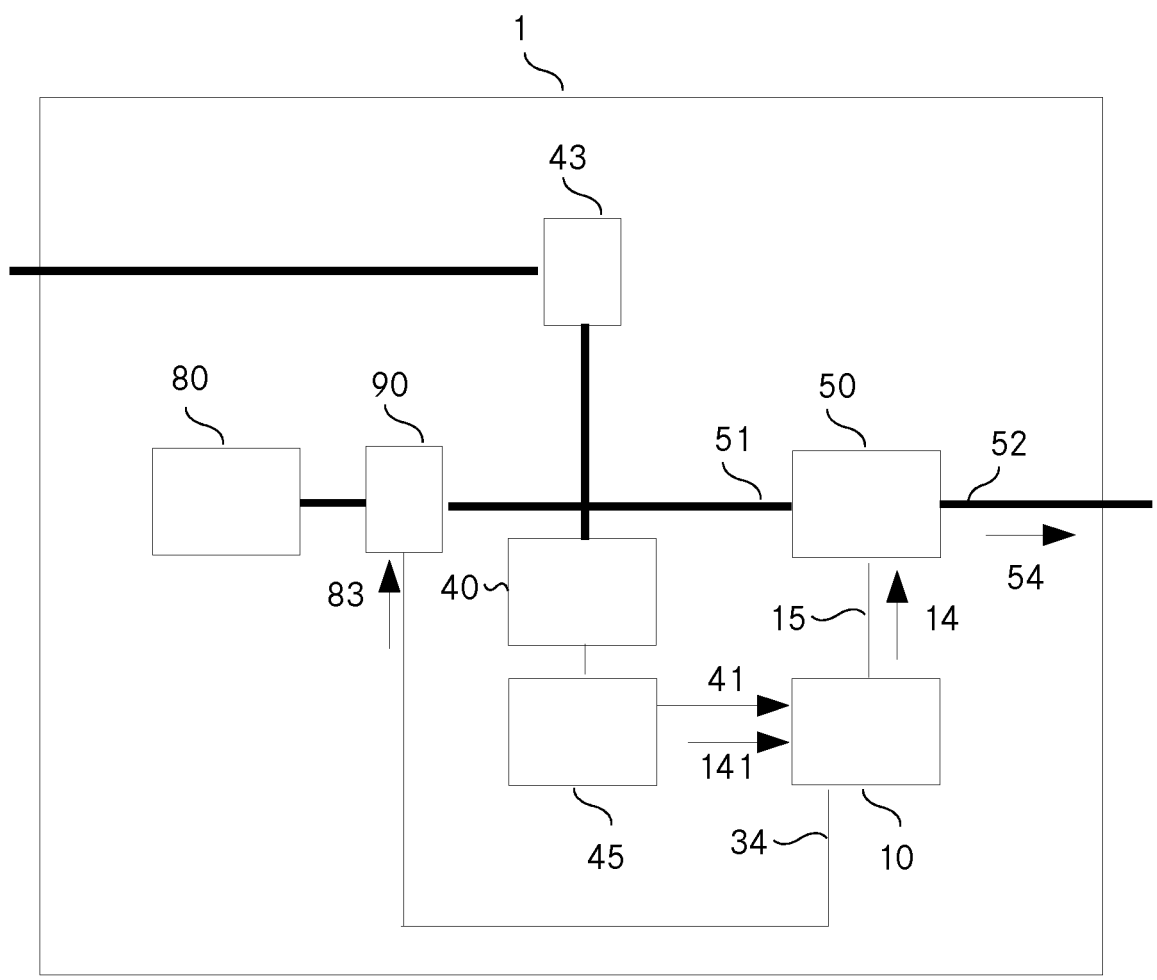
FIG. 8 shows a second extended electrical energy supply unit.

FIG. 8 represents a form of embodiment of the electrical energy supply unit 1 having a voltage converter 90, which is located between the energy source and the first energy store 40, and can be connected via a signal connection to the maximum power regulator 17 (see FIG. 5) of the controller 10.

FIG. 8 additionally represents a form of embodiment of the electrical energy supply unit having a charging device 43, which is connected on one side via a power link (shown in bold) to the first energy store 40, and on the other side via a power link (shown in bold) to a public electricity supply network.

Figure 8A:
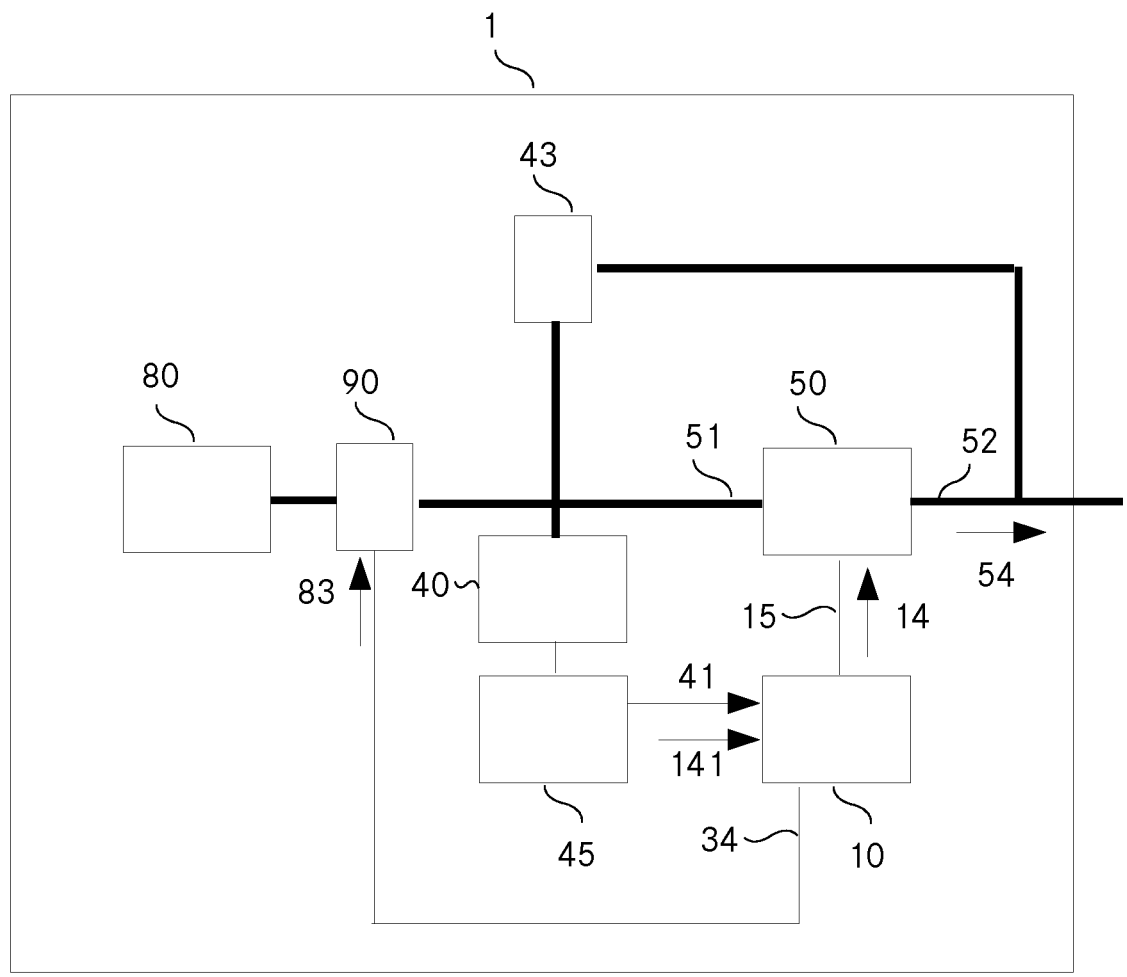

The form of embodiment represented in FIG. 8A only differs from the form of embodiment represented in FIG. 8 in that the input-side power link (shown in bold) of the charging device 43 is connected to the second terminal 52 of the alternating voltage generator 50. If, additionally, a public electricity supply network is connected to the second terminal 52, the charging device 43 is also connected via the second terminal to the public electricity supply network.

Figure 9:
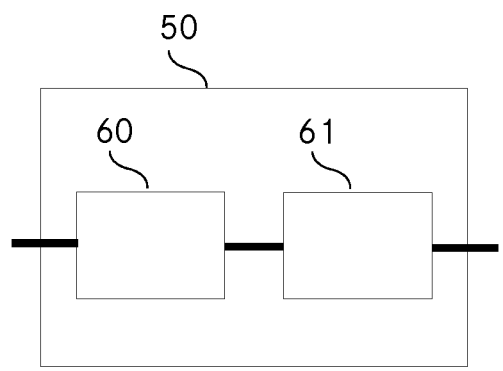
FIG. 9 shows an alternating voltage generator comprising a step-up converter and an inverter having a transformer.

FIG. 9 represents a form of embodiment of the alternating voltage generator comprising a step-up converter and an inverter having a transformer.

The energy supply unit 1, for example, is entirely accommodated in a housing having corresponding externally accessible plug-in connectors, such as socket outlets and jacks.

Figure 10:
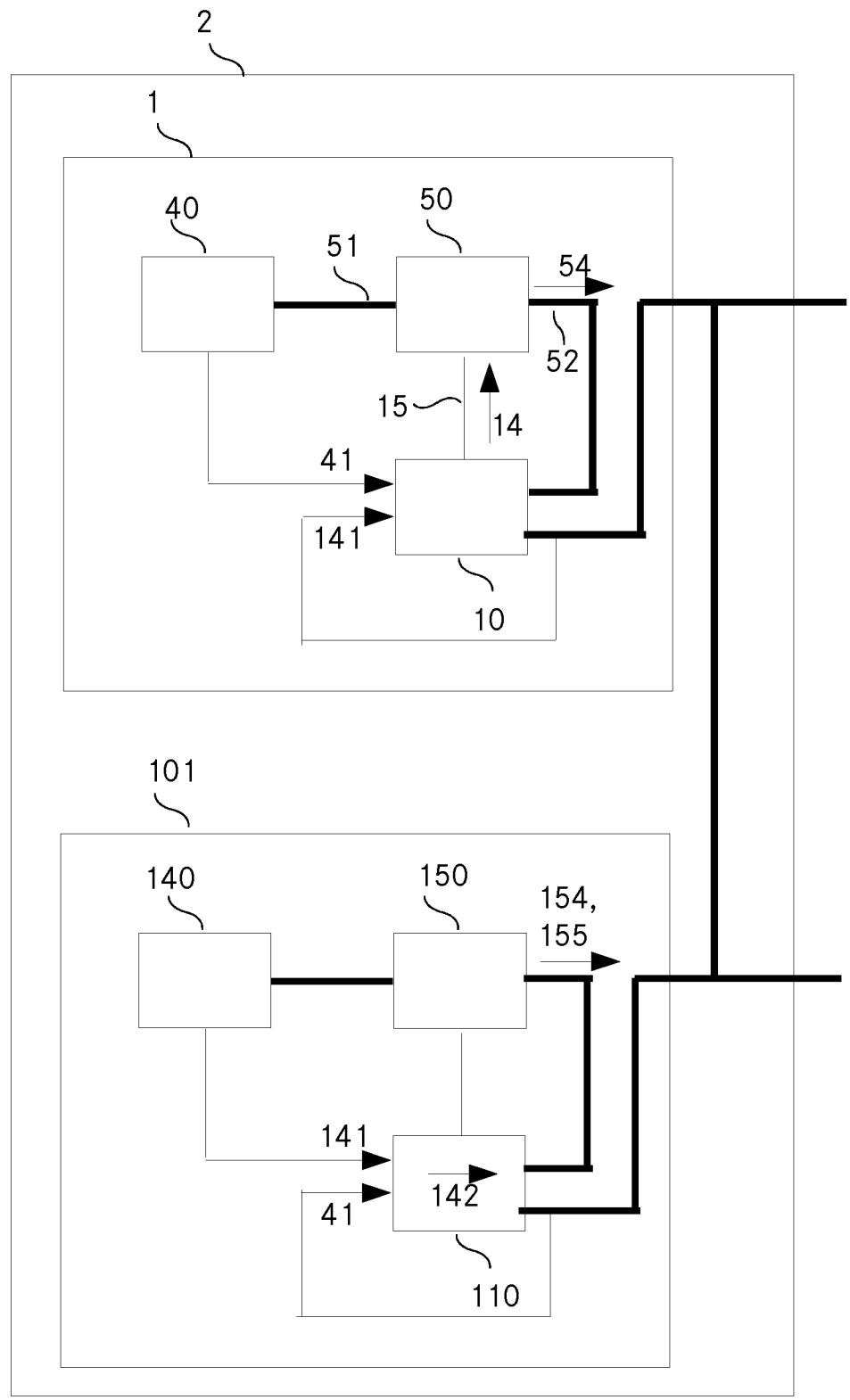
FIG. 10 shows an electrical energy supply system.

FIG. 10 represents a form of embodiment of the electrical energy supply system 2 comprising an electrical energy supply unit 1 according to the invention and a further energy supply unit 101 according to the invention. Both energy supply units 1, 101 are connected via a power link in an electrically conductive manner, for example in the form of a parallel circuit arrangement. A further controller 110 according to the invention of the further electrical energy supply unit 101 can be identical to the controller 10, as represented in FIG. 5 in various forms of embodiment. In FIG. 10, for reasons of space, the further future filling level 142 of the further electrical energy supply unit 101 in the further controller 110 is indicated, with no representation of the detailed relationship, as shown in FIG. 5.

Figure 11:
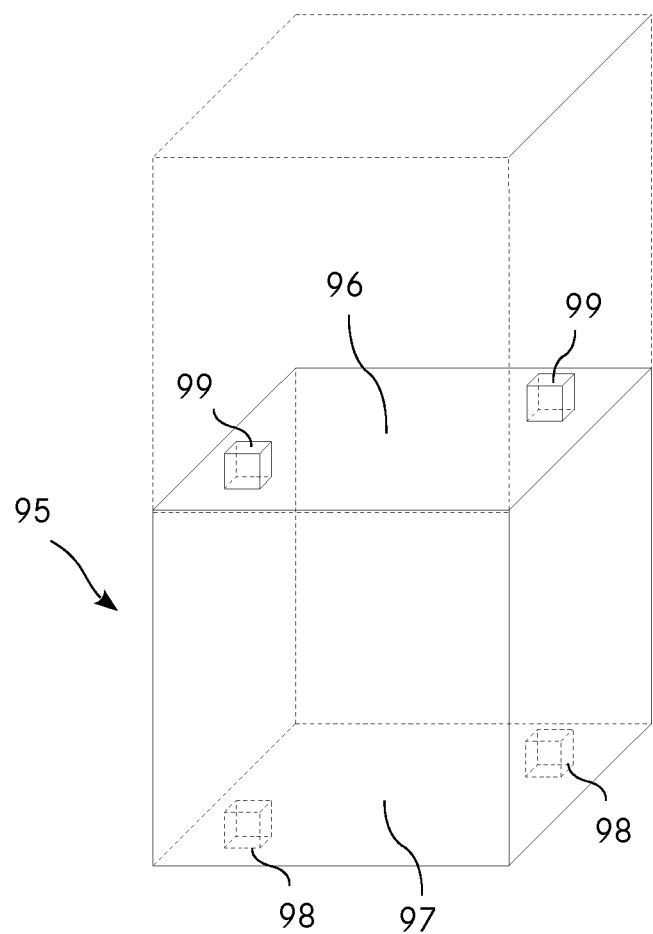
FIG. 11 shows a housing of the electrical energy supply unit.

FIG. 11 represents a form of embodiment of a stackable cuboid housing 95, in which all the components of the electrical energy supply unit, with the exception of the electrical energy source, are accommodated. Specifically, in the region of an underside 97, the housing comprises two cuboid recesses 98. On the top side 96, projections 99 which match the recesses 98 are provided. The housing additionally comprises electric power terminals, in the form of socket outlets and jacks, which are not represented.

In the context of the invention, the above-mentioned forms of embodiment can be varied as desired.

For example, the energy supply system 2 represented in FIG. 10 can also be comprised of more than two and/or of different electrical energy supply units. The first energy store 40 can also be comprised of a plurality of potentially differing energy stores. For example, an accumulator and a fuel cell can be combined to constitute an energy store.

It is also conceivable that, rather than a single electrical energy source 80, a plurality of potentially differing energy sources are provided. Thus, for example, a photovoltaic solar panel can be combined with a wind turbine, in order to reduce the dependence of energy generation upon weather conditions.

In summary, it can be observed that the controller according to the invention permits the exceptionally advantageous and appropriate control of electrical energy supply units. Energy supply units having controllers of this type can be mutually combined in a simple and flexible manner, without the necessity for complex installation or calibration operations. This permits the provision of a simple and secure electrical energy supply, which can be made available independently of a public electricity supply network, and can be adapted to changing requirements in a flexible manner.

What is claimed:

1. A controller for an electrical energy supply unit, comprising:
   a) a first filling level input, to which a first filling level value representing a first filling level of a first energy store of the electrical energy supply unit is transmittable,
   b) a further filling level input, to which a further filling level value representing a further filling level of further energy store of a further electrical energy supply unit is transmittable,
   c) a nominal alternating voltage determiner, which is designed to determine a nominal alternating voltage in consideration of the first filling level and/or of the further filling level, and
   d) a nominal alternating voltage output, from which the nominal alternating voltage is transmittable to an alternating voltage generator of the electrical energy supply unit;
   wherein the nominal alternating voltage determiner is designed to determine a nominal frequency of the nominal alternating voltage in consideration of the first filling level and/or of the further filling level, and/or the controller is designed, from a further frequency of a further alternating voltage on a further alternating voltage generator of the further electrical energy supply unit, to determine the further filling level of the further energy store; and wherein the nominal alternating voltage determiner is configured such that the nominal frequency
   i) corresponds to a further frequency, if the further electrical energy supply unit is connected to the electrical energy supply unit in an electrically conductive manner and if the further filling level exceeds the filling level, and
   ii) is otherwise determined in consideration of the first filling level.

2. The controller as claimed in claim 1, wherein the nominal alternating voltage determiner is configured such that the nominal frequency a) corresponds to the further frequency, if the further electrical energy supply unit is connected to the electrical energy supply unit in an electrically conductive manner, and b) is otherwise determined in consideration of the first filling level.

3. The controller as claimed in claim 1, wherein the nominal alternating voltage determiner can consider the first filling level, such that the nominal frequency consistently rises in tandem with the first filling level.

4. The controller as claimed in claim 1, additionally comprising a maximum power regulator for an electrical energy source of the electrical energy supply unit.

5. The controller as claimed in claim 1, additionally comprising:
   a) an excess power input, to which an excess power of an electrical energy source is transmittable,
   wherein the nominal alternating voltage determiner is additionally configured, at a first filling level of 100%, to determine the nominal frequency in relation to the excess power.

6. The controller as claimed in claim 5, wherein the nominal alternating voltage determiner can consider the first filling level such that the nominal frequency consistently rises in tandem with the excess power.

7. The controller as claimed in claim 1, wherein the nominal alternating voltage determiner is additionally designed to determine a nominal r.m.s. value of the nominal alternating voltage in relation to a filling level differential, wherein the filling level differential is calculated by the deduction of the further filling level from the first filling level.

8. The controller as claimed in claim 7, wherein the nominal alternating voltage determiner is additionally designed to regulate the nominal r.m.s. value of the nominal alternating voltage, such that the filling level differential, in the stationary state, converges towards zero.

9. The controller as claimed in claim 7, wherein the nominal alternating voltage determiner is additionally designed to determine the nominal r.m.s. value of the nominal alternating voltage, in accordance with a current output from the alternating voltage generator.

10. The controller as claimed in claim 1, wherein the nominal alternating voltage determiner is additionally configured to set the nominal alternating voltage for at least one nominal alternating voltage cycle to zero, if an overvoltage occurs within the alternating voltage generator.

11. The controller as claimed in claim 1, additionally comprising:
   a) a load power input, to which a load power of a load which is connected to the electrical energy supply unit is transmittable, and
   b) a generator power input, to which a generator power delivered by the alternating voltage generator of the electrical energy supply unit is transmittable,
wherein the nominal alternating voltage determiner is additionally configured to determine a nominal r.m.s. value such that:
   c) the generator power is greater than the load power, if the first filling level is greater than the further filling level,
   d) the generator power is smaller than the load power, if the first filling level is smaller than the further filling level,
   e) the generator power is equal to the load power, if the first filling level corresponds to the further filling level.

12. The controller as claimed in claim 1, additionally comprising:
   a) an interchange power input, to which an interchange power which flows from the electrical energy supply unit to the further electrical energy supply unit is transmittable, and
   b) a circuit-breaker, which is designed to establish an electrically conductive connection between the electrical energy supply unit and the further electrical energy supply unit, and to interrupt the electrically conductive connection, if:
      i. the interchange power is lower than zero and the first filling level is equal to or lower than a first predefined filling level threshold value,
      ii. the interchange power is greater than zero and the first filling level is equal to or lower than a second predefined filling level threshold value.

13. The electrical energy supply system as claimed in claim 1, wherein a plurality of electrical energy supply units is controlled in the absence of a central controller.

14. An electrical energy supply unit, comprising
   a) a controller having,
   a) a first filling level input, to which a first filling level value representing a first filling level of a first energy store of the electrical energy supply unit is transmittable,
   b) a further filling level input, to which a further filling level value representing a further filling level of a further energy store of a further electrical energy supply unit is transmittable,
   c) a nominal alternating voltage determiner, which is designed to determine a nominal alternating voltage in consideration of the first filling level and/or of the further filling level, and
   d) a nominal alternating voltage output, from which the nominal alternating voltage is transmittable to an alternating voltage generator of the electrical energy supply unit;
   the alternating voltage generator having a first terminal and a second terminal, wherein the first terminal is connected to the first energy store in an electrically conductive manner, and wherein the alternating voltage generator is designed to generate an alternating voltage which corresponds to a nominal alternating voltage on the second terminal;
   wherein the nominal alternating voltage determiner is designed to determine a nominal frequency of the nominal alternating voltage in consideration of the first filling level and/or of the further filling level, and/or the controller is designed, from a further frequency of a further alternating voltage on a further alternating voltage generator of the further electrical energy supply unit, to determine the further filling level of the further energy store; and
   wherein the nominal alternating voltage determiner is configured such that the nominal frequency
      i) corresponds to a further frequency, if the further electrical energy supply unit is connected to the electrical energy supply unit in an electrically conductive manner and if the further filling level exceeds the filling level, and
      ii) is otherwise determined in consideration of the first filling level.

15. The electrical energy supply unit as claimed in claim 14, additionally comprising a filling level detector for determining the first filling level of the first energy store, and/or additionally comprising a charging device, which, on an input side, is connectable to an electricity supply network and, on an output side, is connected to the first energy store.

16. The electrical energy supply unit as claimed in claim 14, additionally comprising an electrical energy source which is connectable to the first energy store in an electrically conductive manner.

17. The electrical energy supply unit as claimed in claim 16, additionally comprising a voltage converter, which is electrically connected on an input side to the electrical energy source, and on an output side to the first energy store.

18. An electrical energy supply system comprising the electrical energy supply unit and the at least one further electrical energy supply unit as claimed in claim 14, wherein the electrical energy supply unit and the further electrical energy supply unit are mutually interconnected in an electrically conductive manner.

19. A method for controlling an electrical energy supply unit, comprising the following steps:
   a) determination of a nominal alternating voltage, in consideration of a first filling level of a first energy store of the electrical energy supply unit and/or of a further filling level of a further energy store of a further electrical energy supply unit configured to be mutually interconnected with the first energy supply unit in an electrically conductive manner,
   b) transmission of the nominal alternating voltage to an alternating voltage generator of the electrical energy supply unit, and
   c) generating a nominal alternating voltage output, from which the nominal alternating voltage is transmittable to an alternating voltage generator of the electrical energy supply unit;
   wherein the nominal alternating voltage determiner is designed to determine a nominal frequency of the nominal alternating voltage in consideration of the first filling level and/or of the further filling level, and/or the controller is designed, from a further frequency of a further alternating voltage on a further alternating voltage generator of the further electrical energy supply unit, to determine the further filling level of the further energy store; and wherein the nominal alternating voltage determiner is configured such that the nominal frequency i) corresponds to a further frequency, if the further electrical energy supply unit is connected to the electrical energy supply unit in an electrically conductive manner and if the further filling level exceeds the filling level, and ii) is otherwise determined in consideration of the first filling level.

\* \* \* \* \*